United States Patent [19]

Biagiotti

[11] Patent Number: 5,509,336
[45] Date of Patent: Apr. 23, 1996

[54] APPARATUS FOR SUPPORTING AND RESTRAINING A LOG OF PAPER DURING THE CUTTING THEREOF BY A LOG-SAW

[75] Inventor: Guglielmo Biagiotti, Lucca, Italy

[73] Assignee: Fabio Perini S.p.A., Lucca, Italy

[21] Appl. No.: 155,022

[22] Filed: Nov. 19, 1993

[30] Foreign Application Priority Data

Dec. 14, 1992 [IT] Italy ...................... FI92A234

[51] Int. Cl.⁶ ...................... B26D 3/16
[52] U.S. Cl. .............. 83/461; 83/465; 83/466; 279/109
[58] Field of Search ............. 83/452, 461, 465, 83/466, 282, 466.1, 458; 269/43, 287; 279/109, 106; 144/34 R, 378

[56] References Cited

U.S. PATENT DOCUMENTS

| | | | |
|---|---|---|---|
| Re. 30,598 | 5/1981 | Spencer | 83/14 |
| 2,354,794 | 8/1944 | Buehler | 269/43 |
| 2,428,185 | 9/1947 | Wallace | 83/461 |
| 3,912,287 | 10/1975 | Steinmetz | 279/106 |
| 4,263,084 | 4/1981 | Takala | 269/43 |
| 4,428,263 | 1/1984 | Lindee et al. | 83/354 |
| 4,938,489 | 7/1990 | Nemirovsky | 279/1 L |
| 5,038,647 | 8/1991 | Biagiotti | 83/466.1 |

FOREIGN PATENT DOCUMENTS

| | | |
|---|---|---|
| 0484151 | 5/1928 | Germany . |
| 0484150 | 10/1929 | Germany . |
| 2446125 | 4/1976 | Germany . |
| 3225399 | 2/1983 | Germany . |
| 0514380 | 12/1971 | Switzerland . |

Primary Examiner—Rinaldi I. Hada
Assistant Examiner—Allan M. Schrock
Attorney, Agent, or Firm—Francis J. Bouda

[57] ABSTRACT

The apparatus for holding a log or long roll (L) of web material during the cutting thereof along a plane perpendicular to the log axis, includes: a plurality of clamping elements distributed in a circle around the log (L). The clamping elements can be moved so as to clamp the log during the cut and also to be released so as to allow the log to axially move between cuts. At least one actuator causes the movement of the clamping elements, and connectors which connect the clamping elements to one another to provide a simultaneous movement thereof by said actuator. Each clamping element pivots around an axis so as to cause clamping of the log. The connectors control the pivoting of said clamping elements.

3 Claims, 6 Drawing Sheets

APPARATUS FOR SUPPORTING AND RESTRAINING A LOG OF PAPER DURING THE CUTTING THEREOF BY A LOG-SAW

BACKGROUND OF THE INVENTION

The invention refers to an apparatus for holding a log or roll of web material such as paper, for example, during cutting thereof along a plane perpendicular to the log axis.

More particularly, the invention refers to an apparatus including a plurality of clamping elements distributed in a circle around the log, which are able to be moved so as to clamp the log during the cutting thereof but which can be released so as to allow said log to move forward between cuts. At least one actuator causes the movement of said clamping elements. Connectors which connect the clamping elements to one another to provide a simultaneous movement are driven by said actuator.

An apparatus of this type is described, for example, in the U.S. Pat. No. 5,038,647.

In the paper converting industry, relatively long ( e.g. 3–4 meters) logs or rolls of reeled paper material are frequently produced. Upon completion of the reeling, the logs are cut along planes perpendicular to their axes for the production of small rolls (e.g. 10–12 cm) of all-purpose wipers, toilet paper or similar products. The cutting of the log is accomplished by means of a log-saw provided with a suitable cutting tool which, in case of logs of limited diameters (e.g. 10–20 cm) is a rotating disk. In case of logs of larger diameters, it has been suggested (see for example the above-mentioned U.S. Pat. No. 5,038,647) the use of a band saw or similar cutting-off machine. In any case, the log is held, during the cut, in the regions adjacent to the cutting plane, both upstream and downstream of said region. The cited U.S. Pat. No. 5,038,647 describes a special clamping device which comprises radially movable slide members for circumferentially clamping the log during the cutting operation and releasing it to allow for its axial advancement between cuts. The movement, in radial direction, of the slides is obtained by a ring in which guide slots inclined with respect to the radial direction are formed, with journals which are fixed to the respective slides being able to slide within said guide slots. The rotation of the ring about its own centre causes a centripetal and centrifugal radial movement of the slides.

This holding device of known type, although extremely effective and reliable, exhibits some drawbacks due both to the complexity of the mechanical members used, and to the rigidity of the system which is suitable only for logs whose diameters vary within a somewhat limited range.

OBJECTS OF THE INVENTION

The object of the present invention is to provide a new apparatus for clamping logs within cutting-off machines which overcomes the drawbacks of the traditional apparatuses.

More in particular, a first object of the present invention is to provide a log-clamping apparatus which is particularly simple and reliable in use.

A further object of the invention is to provide a clamping apparatus in which the sliding mechanisms are eliminated and, thereby, wear effects are limited.

A further object of the present invention is to provide a universal clamping apparatus and, therefore, easily adaptable to logs of considerably varying diameters, for example in the range of 220 to 450 mm.

A further object of the invention is to provide a clamping apparatus in which the operations for accommodating logs of various diameters are particularly simple and quickly performed.

These and further objects and advantages of the apparatus according to the present invention will become apparent to those skilled in the art by a reading of the following description.

In practice, the apparatus according to the invention is characterized in that each clamping element is articulated to an oscillation axis thereof, the oscillation about each axis causing the clamping of the log, and in that the connection means between contiguous clamping elements transmit the oscillation movement from one clamping element to the elements adjacent thereto.

By this arrangement, the clamping elements are no longer mounted on slides which are subject to wear, but consist instead of oscillating elements of extremely simple construction and maintenance. Also eliminated are all the guides necessary for the centripetal and centrifugal movement of the clamping elements of traditional type.

Each clamping element may be operated by an actuator of its own. In this case, the connector is the actuators-controlling electrical (or hydraulic) system. Preferably and advantageously, the arrangement includes a single actuator and a plurality of mechanical means for mutually connecting the individual clamping elements and transmitting the actuator motion thereto. Various other solutions are also possible using, for example, two actuators, each of which operates a set of clamping elements.

The clamping elements are arranged at an angle with respect to a straight line passing through the oscillation axis and the centre of the log to be clamped. More precisely, a geometric plane which passes through the surface of contact of each clamping element and through the respective oscillation axis of the clamping element, forms an angle of less than 90° with a plane passing through said oscillation axis and the axis of the log. This angle may be adjusted according to the diameter of the log to be clamped, i.e., the larger the diameter of the log, the larger said angle.

In one embodiment, in order to mutually connect the individual clamping elements, so as to transmit the motion from one element to the other and make them move in synchronism, provision is made for each clamping element to be hinged to two link rods each of which is hinged at its ends to two contiguous clamping elements to connect them one to the other. A kinematic chain is thus formed which connects the clamping elements. To obtain the simultaneous movement of all the elements, it is sufficient to connect one of the clamping elements to the actuator. Advantageously, one of the link rods may be of adjustable length, provided, for example, by a threaded rod system. This allows the adjustment and the taking up of possible clearances in the kinematic chain connecting the individual clamping elements.

In a particularly advantageous embodiment of the apparatus according to the invention, each clamping element has a log-contacting surface which is carried by an oscillating arm hinged to the oscillation axis of said element, said arm having a curved shape with a concave profile facing the log axis. This particular shape allows wide adjustments of the position of the clamping elements in order to handle logs of widely ranging diameters. In fact, the curvature of the arm of each clamping element prevents the latter from interfering with the tip of the preceding clamping element, even when the diameter of the log being processed is relatively large.

To move the clamping elements into oscillation, and thus to operate the clamping and releasing of the log during the cutting operation, provision may be made for an actuator (for example, a cylinder-piston) connected to an appendix secured to one of the clamping elements. Advantageously, this actuator may be a short-stroke actuator carried by a movable slide so that, by adjusting the position of the actuator with respect to the centre of the system made up of the clamping elements, there is obtained an adjustment of the angular position of the clamping elements and thus an adaptation of the apparatus to the diameter of the log to be treated.

Since, in a log-cutting machine, the guide into which the log is pushed is usually at a fixed position, the variation of the angular position of the clamping elements to accommodate different diameters requires a simultaneous adjustment, in vertical direction, of the position of the clamping elements system so as to bring the centre of said system to coincide with the axis of the log as it moves forward on the guide of the log-saw. To accomplish this, the clamping elements system of the apparatus of the invention may be mounted on a vertically movable slide.

The invention further refers to a log saw clamping device of the type described above wherein two of said devices are provided at the cut region, one on each side of the log-saw blade as it passes through the cut plane.

The apparatus is particularly suitable for use in band-type log-saws which accommodate logs of significantly large diameter.

DETAILED DESCRIPTION

The invention will be better understood by following the description and the attached drawing, which shows a practical, not limiting example, of the same invention. In the drawing.

Figure 1:
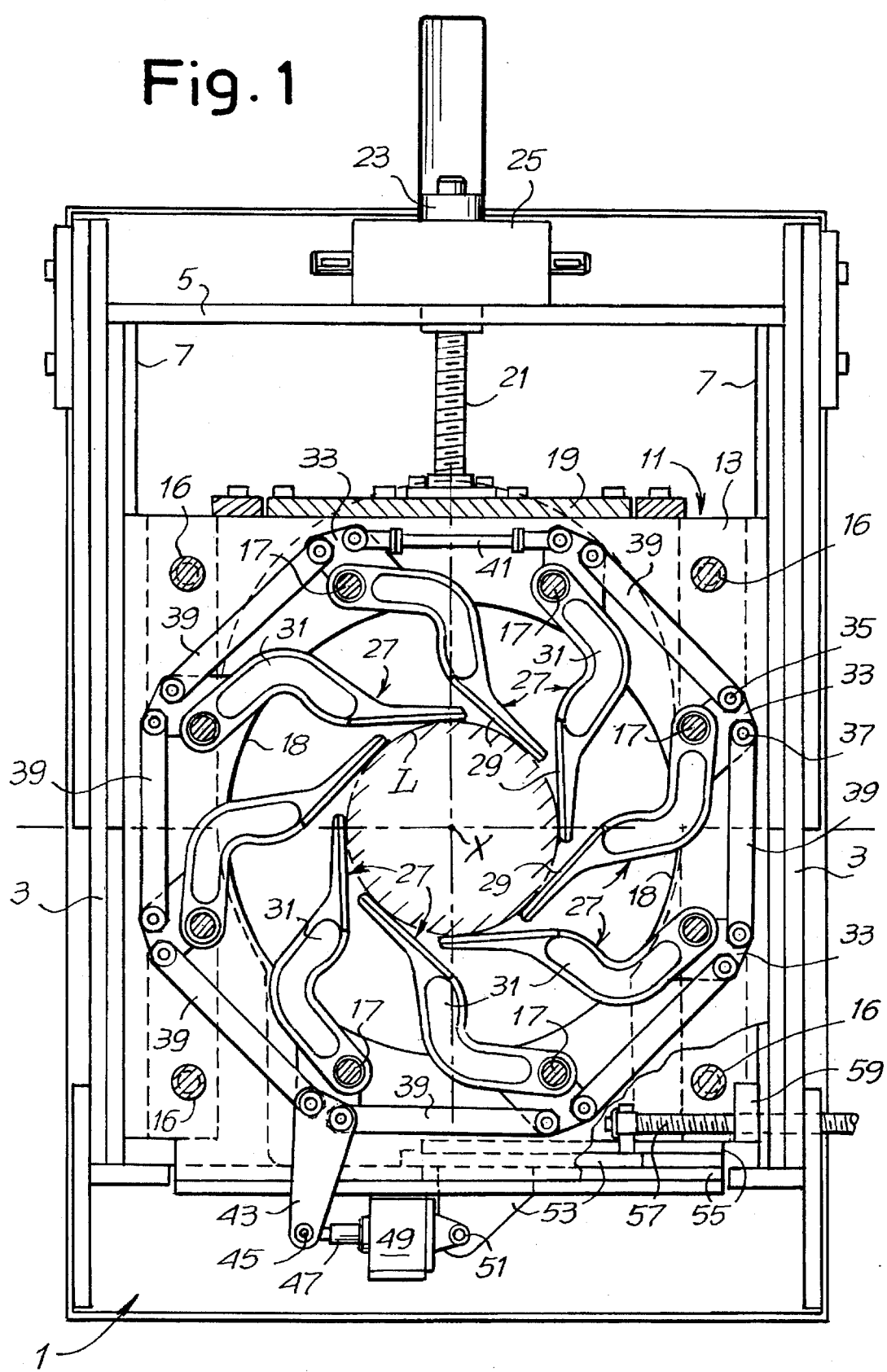
FIGS. 1 and 2 show sections of the apparatus, according to the invention, one in the minimum and the other in the maximum diameter of the log, taken on line I—I of FIG. 4.

In a log-saw, two holding devices are usually disposed at the sides of the cutting plane. This can be seen in particular in FIGS. 3 and 4 where the two devices are indicated at A and B, respectively. Hereinafter, only one of the two devices will be described in detail, the other being symmetrically the same.

The apparatus has a frame, generally designated 1, provided with two pillars and a cross-piece 5. Disposed along the pillar are vertical guides 7 along which a unit 11 slides vertically, and disposed on said unit are the clamping elements of the log to be cut. Each unit 11 is provided with two plates 13, 15, arranged parallel to each other and to the guides 7, and connected to one another by spacers 16. The plates 13 and 15 are connected on top by a connection member 19 connected to a threaded bar 21 fitted within a nut screw 23 associated to a jack 25, the latter providing for the lifting and lowering movement of the unit 11.

Figure 2:
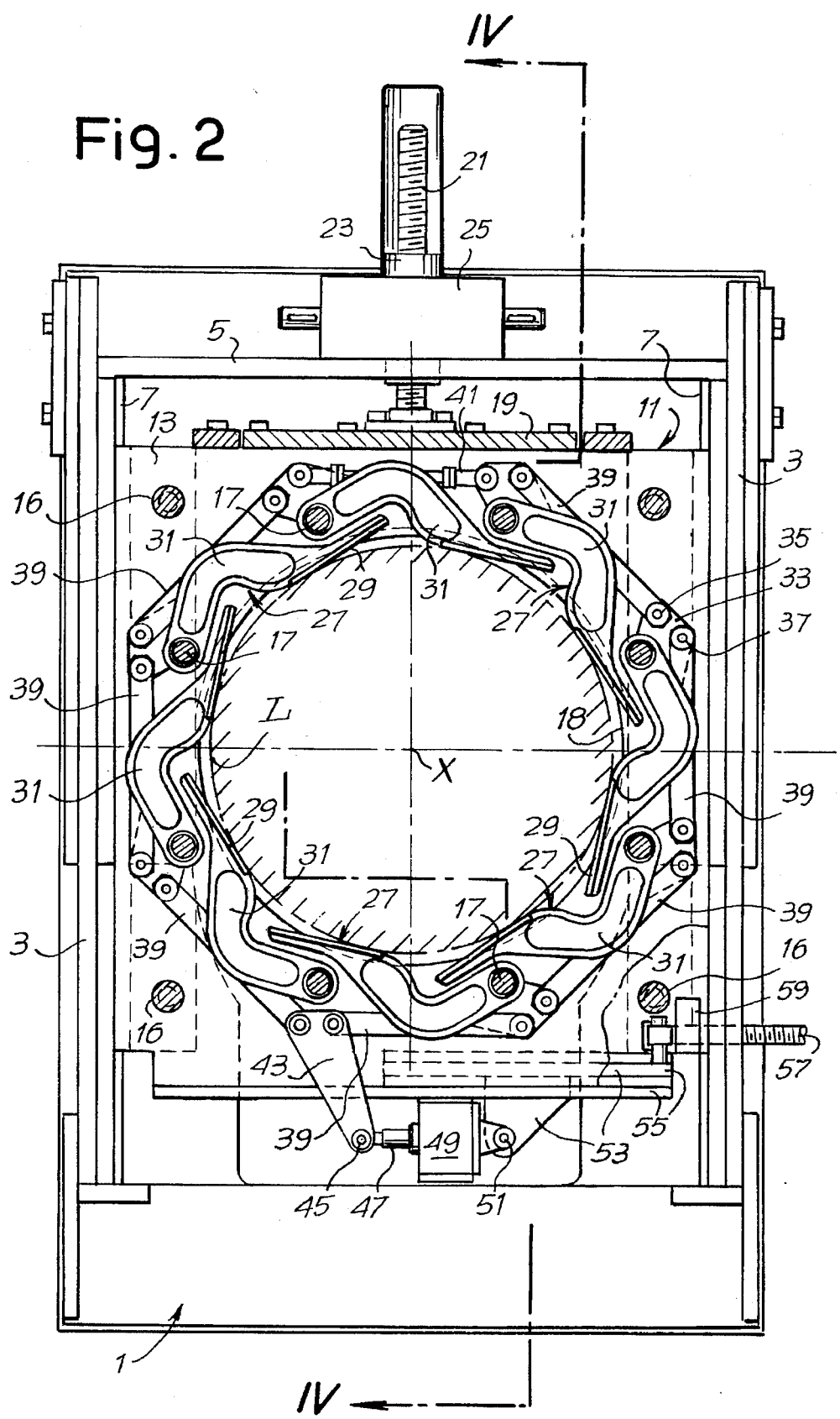

Mounted between the two plates 13, 15 are journals 17 uniformly distributed around a central opening 18. Each journal 17 is articulated to a clamping element generally designated 27. In the example shown in the drawing, provision is made for eight journals and for as many clamping elements 27, which form a kind of crown placed in a circle around a horizontal central axis X corresponding to the axis of the logs L to be cut. FIGS. 1 and 2 show logs L of different diameters and, in particular, those corresponding approximately to the minimum and maximum diameter, respectively.

Each clamping element 27 is disposed so that the plane containing the axis X and the axis of the relevant oscillating journal 17 will form an angle less than 90° with the plane containing the region of contact between the clamping element and the log and the axis of the same journal 17. The larger is this angle, the larger the diameter of the logs to be treated.

Figure 5:
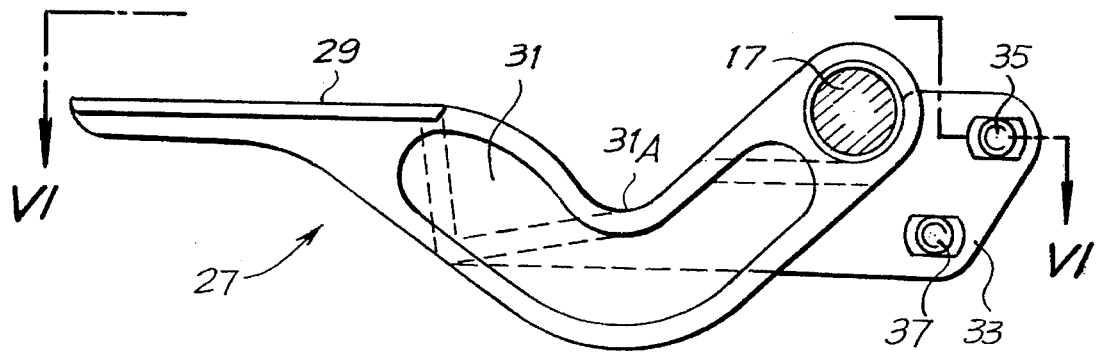
FIG. 5 shows a side view of an individual clamping element.
Figure 6:
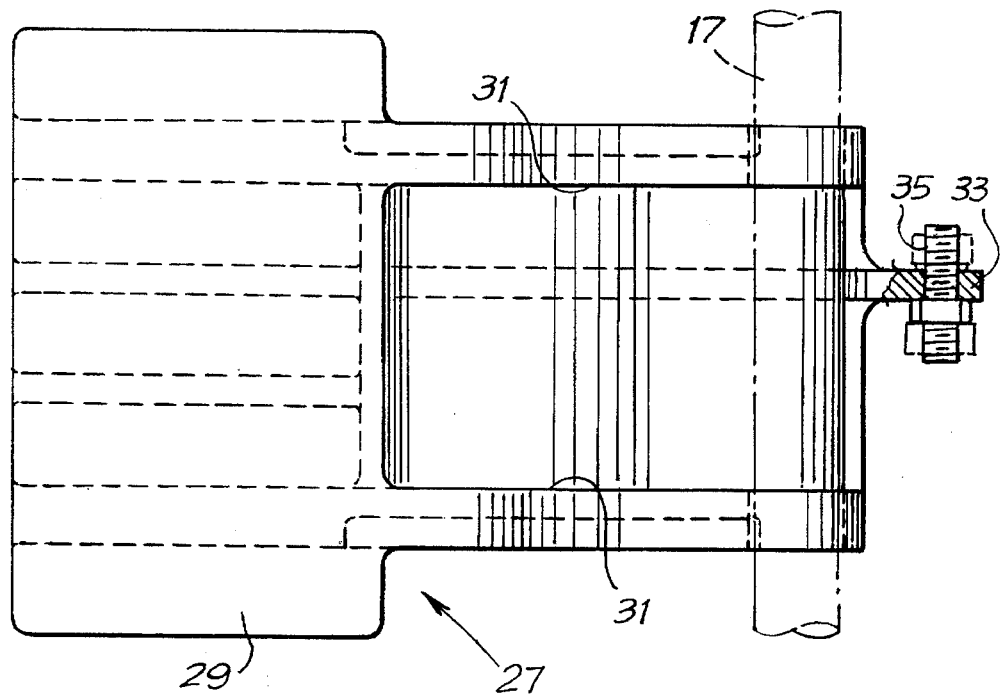
FIG. 6 shows a plan view on line VI—VI of FIG. 5.

As can be seen in particular in FIGS. 5 and 6, each clamping element 27 includes a flat surface 29 which cooperates with the cylindrical surface of the logs, and a curved arm 31 which connects the portion 29 to the oscillating journal 17. The arm 31 of each clamping element 27 has a curvature 31A with a concavity facing the centre of the system formed by the clamping elements 27. The curvature 31A of the arms 31 of the individual elements is intended, as will be explained later, to avoid interference between adjacent clamping elements, also when the diameter of the log to be clamped is considerably large.

Each clamping element 27 is further provided with an appendix or bracket 33 on which two pivot pins 35 and 37 are provided, respectively. Articulated to each of the pivot pins 35 and 37 is one end of a respective link rod 39 which connects two contiguous clamping elements. As can be clearly seen in FIGS. 1 and 2, a kinematic chain is thus obtained made up of eight link rods which connect the eight clamping elements 27 in order that they may simultaneously oscillate about their respective journals 17, each clamping element thus performing an oscillation through a same angle. In the illustrated example, there are provided seven link rods 39 of fixed length and an eighth link rod 41 of variable length. The link rod 41 enables an adjustment and makes it possible to take up any slack or clearances of the kinematic chain formed by the link rods 39, 41 and by the brackets or appendixes 33 of the various clamping elements 27.

One of the clamping elements 27 is fixed to a lever or appendix 43 to the distal end of which the rod 47 of a short stroke-type cylinder-piston actuator 49 is hinged at 45. The cylinder of the actuator 49 is hinged at 51 to a slide 53 sliding within a horizontal guide 55. The sliding is achieved via a threaded bar 57 which is engaged within a screw nut 59 and which may be associated to a motor or a manually operated adjustment handwheel.

As clearly shown in FIGS. 1 and 2, a horizontal translation of the actuator 49 causes a variation in the angular position of each clamping element 27. In this way, the apparatus may be adjusted for handling logs of different diameters. In fact, the clamping elements 27 must oscillate within a very small angle during the cutting operations, this oscillation being determined by the limited stroke of the rod 47 of the short stroke-type cylinder-piston actuator 49. This is required because the log clamping and releasing operations must take place in an extremely short time for the log-saw to give a high productivity. For this reason, by varying the diameter of the log L, the angular position of the clamping elements 27 is varied as well, so that a different middle angular position of each clamping element 27 will correspond to each log diameter.

Figure 7:
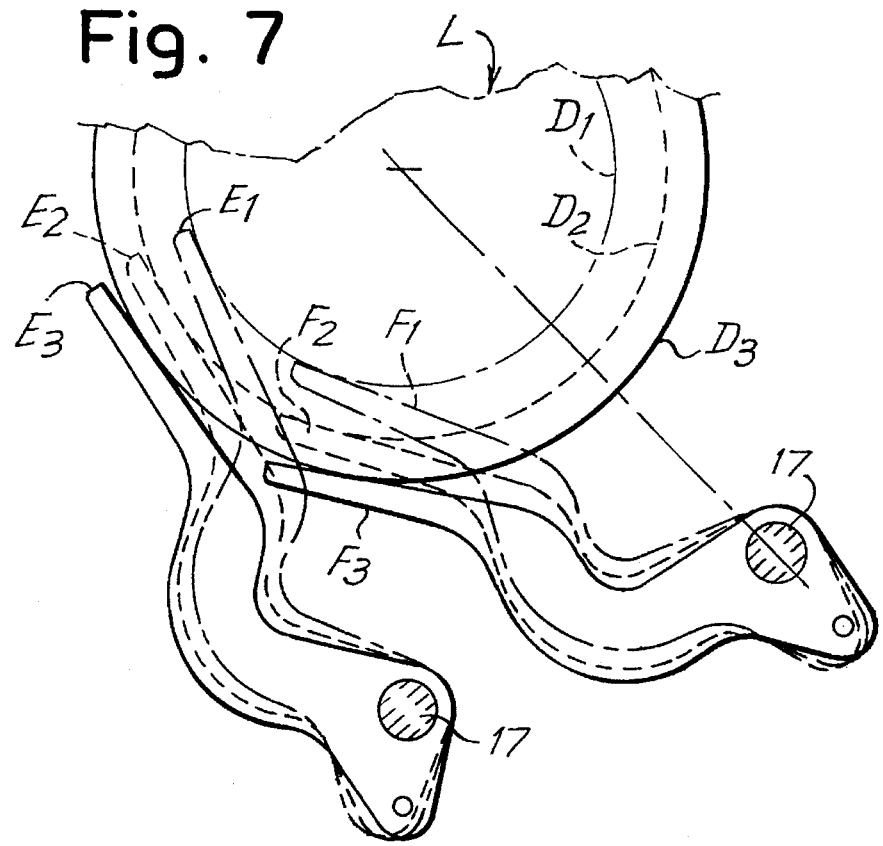
FIGS. 7 and 8 show schematically the variation of the angular position of a pair of contiguous clamping elements as a function of the variation of the diameter of the log to be treated.
Figure 8:
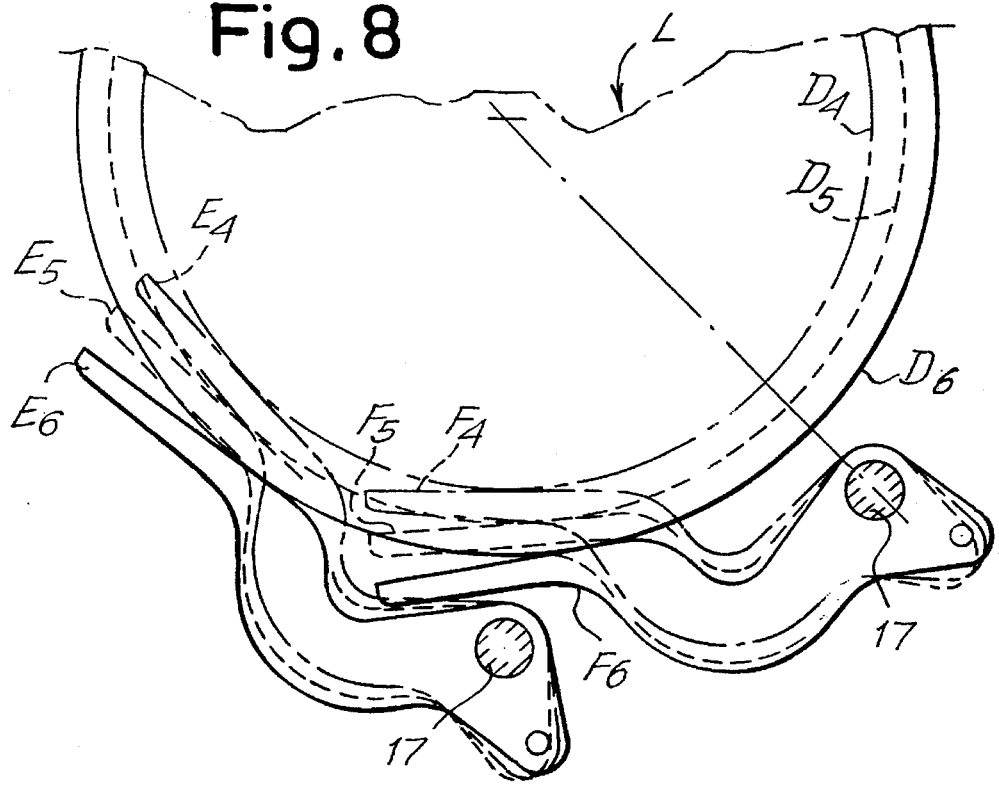

FIGS. 7 and 8 show the various positions taken up by two adjacent clamping elements 27 upon variation of the diameter of the treated logs. D1–D6 indicate six different diameters of logs to be treated, D1 being the smallest diameter and D6 the largest. E1–E6 indicate the six different middle angular positions taken up by a first clamping element 27A in correspondence of the diameters D1–D6. Conversely, F1–F6 indicate the corresponding middle angular positions of a second clamping element 27B adjacent to the element 27A. Whatever the middle angular position taken up by the adjacent clamping elements 27A, 27B there will never be any interference between them, even with a diameter D varying to a considerable extent, owing to the curvature 31A of the arm 31 of each clamping element 27. FIGS. 7 and 8 show also that the region of contact between each clamping element 27 and the log moves along the flat surface 29 when varying the diameter D of the log to be treated.

It will be apparent from what has been described above that the apparatus according to the invention is suitable for widely ranging diameters of logs (for example, between 220 and 450 mm) with extremely simple adjustment operations which are limited to the registration in vertical direction by the jack 25 in order to bring the centre of the system made up of the clamping elements 27 to coincide with the logs axis X, and to the adjustment of the transversal position of the cylinder-piston actuator 49 in order to adjust the middle position of each clamping element 27.

Figure 3:
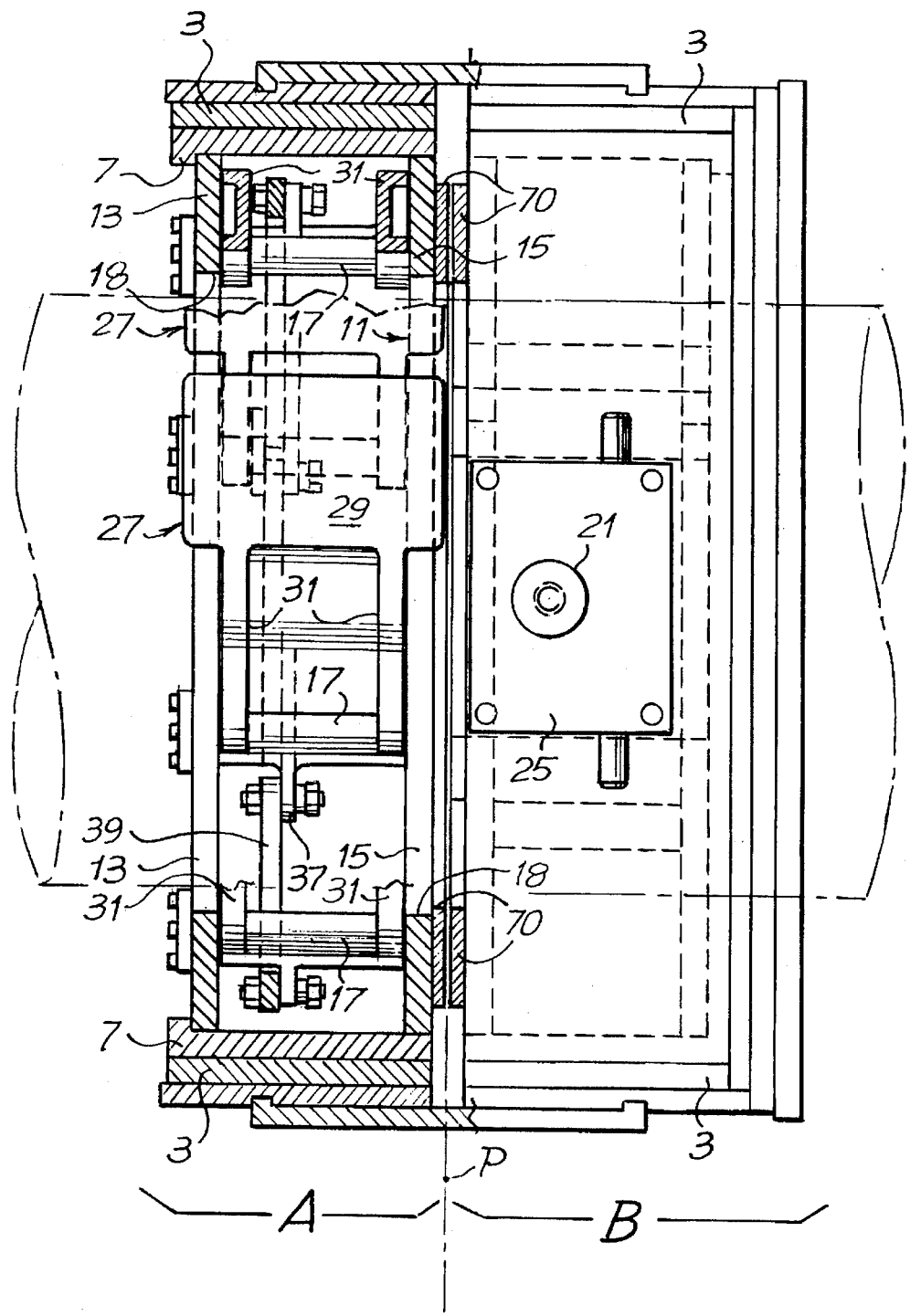
FIG. 3 shows a sectional view on line III—III of FIG. 4.
Figure 4:
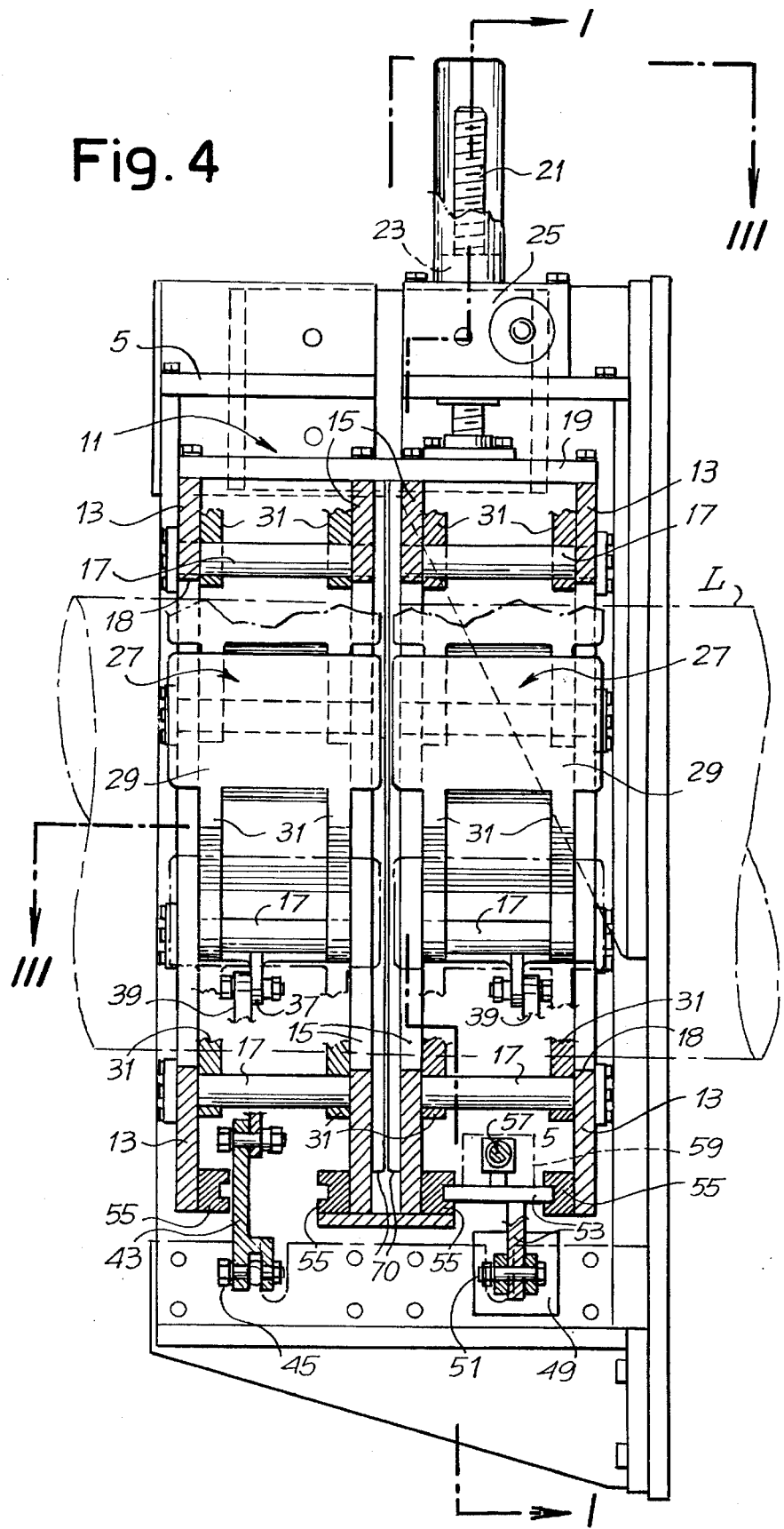
FIG. 4 shows a sectional view on line IV—IV of FIG. 2.

As can be seen in FIG. 3, the two devices A and B are arranged parallel to each other on either side of the cutting plane P through which the blade of the log-saw passes. Applied on the side-by-side disposed plates 15 of the two devices A and B are blade guiding means 70, well-known in the art.

It is furthermore to be understood that the present invention may be embodied in other specific forms without departing from the spirit or special attributes, and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. Apparatus for holding a log (L) of web material during the cutting thereof along a plane perpendicular to the longitudinal log axis (X), comprising:

a plurality of curved clamping elements (27) distributed around the longitudinal log axis (X) and arranged to clamp the log during cutting and also to allow said log to be moved axially between cuts, each clamping element (27) including a journal (17) at one end and a substantially flat log contacting member (29) at its other end, a plurality of links (39) interconnected with the clamping elements (27), each of said links being connected between successive clamping elements and said plurality of links being mounted radially outside of said clamping elements, at least one actuator (49) connected to said links which causes movement of said links and a simultaneous oscillation of said curved clamping elements (27) about the journals (17), whereby when the clamping elements (27) oscillate in the same direction about their journals (17), the log is clamped by the log contacting members (29), each curved clamping element (27) forming a concave recess between the log contacting member (29) and the journal (17), wherein the log contacting member (29) of each curved element (27) nests within the concave recess of an adjacent element when the links (39) move the log-contacting members (29) away from the log, wherein the faces of the log-contacting members (29) are smooth so as to permit the log to slide thereon while the log is moved axially between cuts with the faces in contact with the log.

2. The apparatus of claim 1 wherein the log-contacting member (29) of each curved element (27) is diametrically opposite a log-contacting member of another curved arm.

3. The apparatus of claim 1 wherein one of the links is adjustable in length.

\* \* \* \* \*